(12) United States Patent
Pan (10) Patent No.: US 8,844,568 B2
(45) Date of Patent: Sep. 30, 2014

(54) MULTI-CHANNEL STEPPED MOTOR OPERATED GAS ADJUSTING VALVE

(76) Inventor: Zhaokeng Pan, Foshan (CN)

( * ) Notice: Subject to any disclaimer, the term of this patent is extended or adjusted under 35 U.S.C. 154(b) by 354 days.

(21) Appl. No.: 13/502,773

(22) PCT Filed: Oct. 21, 2010

(86) PCT No.: PCT/CN2010/001650
§ 371 (c)(1),
(2), (4) Date: Apr. 19, 2012

(87) PCT Pub. No.: WO2011/047541
PCT Pub. Date: Apr. 28, 2011

(65) Prior Publication Data
US 2012/0204979 A1    Aug. 16, 2012

(30) Foreign Application Priority Data
Oct. 21, 2009    (CN) .......................... 2009 1 0193325

(51) Int. Cl.
| | |
|---|---|
| F16K 11/072 | (2006.01) |
| F16K 31/04 | (2006.01) |
| F16K 37/00 | (2006.01) |
| F16K 27/04 | (2006.01) |

(52) U.S. Cl.
CPC ............. *F16K 27/045* (2013.01); *F16K 27/048* (2013.01); *F16K 31/042* (2013.01); *F16K 11/072* (2013.01); *Y10S 137/905* (2013.01)
USPC ...... 137/625.15; 137/554; 137/625; 137/905; 251/129.12; 251/206

(58) Field of Classification Search
USPC .......... 137/554, 625, 625.11, 625.12, 625.13, 137/625.15, 625.46, 628, 905; 251/129.12, 251/206, 208
See application file for complete search history.

(56) References Cited

U.S. PATENT DOCUMENTS

| | | | |
|---|---|---|---|
| 891,076 A | * | 6/1908 | Jarmolowsky ............ 137/625.12 |
| 923,433 A | * | 6/1909 | Kaschub ....................... 137/905 |

(Continued)

FOREIGN PATENT DOCUMENTS

| | | |
|---|---|---|
| CN | 2494463 | 6/2002 |
| CN | 1601184 | 3/2005 |

(Continued)

OTHER PUBLICATIONS

International Search Report corresponding International Application No. PCT/CN2010/001650 dated Jan. 27, 2011.

*Primary Examiner* — John Rivell
(74) *Attorney, Agent, or Firm* — RatnerPrestia (57) ABSTRACT

A multi-channel stepped motor operated gas adjusting valve includes a valve shell, a reduction motor, a locator, a gas flow distributor and a locator rotation angle detecting mechanism. The gas flow distributor has a disk which is tightly attached to a hard hollow washer. An inner wall of the valve shell is provided with locating ends corresponding to a group of locating nodes to form the locator rotation angle detecting mechanism. Each locating node is placed corresponding to a gas flow distribution groove of the same sequence. The inner wall of the valve shell is also provided with stopping blocks at a beginning state and an ending state of the locator. The valve enables accurate control by utilizing an action position feedback signal and a control circuit, and enables multi-position stepped adjustment on gas flow rate upon multi-channel gas passages simultaneously. The valve can independently cut the multi-channel gas passages.

8 Claims, 4 Drawing Sheets

(56) References Cited

U.S. PATENT DOCUMENTS

| | | | | |
|---|---|---|---|---|
| 1,154,177 | A | * | 9/1915 | Detwiler ........................ 137/905 |
| 1,228,469 | A | * | 6/1917 | Mueller ..................... 137/625.12 |
| 1,630,781 | A | * | 5/1927 | Burman ..................... 137/625.12 |
| 2,062,749 | A | * | 12/1936 | Hartwig ..................... 137/625.15 |
| 2,075,458 | A | * | 3/1937 | Parker ....................... 137/625.11 |
| 2,209,132 | A | * | 7/1940 | Parker ....................... 137/625.11 |
| 2,335,085 | A | * | 11/1943 | Roberts ......................... 137/905 |
| 2,389,000 | A | * | 11/1945 | Roberts ..................... 137/625.12 |
| 3,116,757 | A | * | 1/1964 | Donguy et al. .......... 137/625.11 |
| 5,261,451 | A | * | 11/1993 | Spencer ........................ 137/554 |
| 5,799,698 | A | * | 9/1998 | Lin ............................... 137/628 |
| 6,109,302 | A | | 8/2000 | Bircann |

FOREIGN PATENT DOCUMENTS

| | | |
|---|---|---|
| CN | 201318496 | 9/2009 |
| CN | 101696742 | 4/2010 |
| FR | 2827362 | 1/2003 |
| JP | 8-151963 | 6/1996 |

\* cited by examiner

MULTI-CHANNEL STEPPED MOTOR OPERATED GAS ADJUSTING VALVE

CROSS REFERENCE TO RELATED APPLICATIONS

This application is the U.S. National Phase Application of PCT International Application No. PCT/CN2010/001650, filed Oct. 21, 2010, which claims priority to Chinese Patent Application No. 200910193325.5, filed Oct. 21, 2009, the contents of such applications being incorporated by reference herein.

FIELD OF THE INVENTION

The invention relates to a gas adjusting valve and, more particularly, to a multi-channel stepped motor operated gas adjusting valve.

BACKGROUND OF THE INVENTION

Gas adjusting valves in the conventional technology are mainly electromagnetic ones which adjust a gas flow in a linear gradient mode. Such an electromagnetic valve uses an electromagnet as a driving element to vary the gas flow by changing a current of a winding of a magnet coil. The current of the magnet coil is substantially in a linear relation with the variation of the gas flow. The electromagnetic valve is usually used in thermostatic control of a gas-typed water heater, and characterized by having a fast adjusting speed and a large operating current. However, the electromagnetic valve will still consume a certain quantity of electric energy when keeping a certain quantity of gas flow. Besides, one electromagnetic valve is able to adjust the gas flow in only one gas channel, and the electromagnetic valve needs a high accuracy and cost during manufacturing.

Among the conventional gas appliances which need automatic adjustment of the gas flow, not all the gas appliances require the gas flow to be adjusted fast, continuously and linearly, however, some of the gas appliances need to vary gas flows in various gas channels simultaneously. To save electric power, the motor operated gas adjusting valve in the gas appliance is required not only to consume no electric power under a predetermined gas flow, but also to be capable of shutting off the gas channel. For example, in a household automatic gas stove, when the stove has a double-ring fire, the adjusting valve for controlling the gas flow in each burner is required to control different gas flows in two gas channels corresponding to the inner-ring fire and the outer-ring fire at the same time, and be capable of shutting off the two gas channels. Similarly, when the stove has a three-ring fire, the gas adjusting valve is required to control the gas flows of three gas channels corresponding to the inner-ring fire, the middle-ring fire and the outer-ring fire at the same time, and be capable of shutting off the three gas channels. In the prior art, each gas channel needs an independent gas adjusting valve; and if an independent shutting off function is needed, an additional gas cut-off valve needs to be disposed in each gas channel when the adjusting valve does not have the gas shutting off function. As a result, more than five gas electromagnetic valves including a main switch valve are needed, even if the stove is only a household gas stove with two burners both having a double-ring fire.

A CN patent application entitled "double closed type gas valve with adjustable flux", whose publication number is CN1601184, which is incorporated by reference, is published in the Chinese patent gazette. The double-closed type gas adjusting valve therein can only shut off gas channels of a big fire and a kindling/small fire at the same time, rather than shut off the gas channel of the kindling fire or the big fire independently. The gas flow of the kindling fire is only a fixed value and cannot be adjusted independently. Besides, adjusting of the big fire can only be performed in an open-loop control mode because relative positions of an adjusting body and an adjusting opening cannot be accurately determined. When the gas valve is controlled in the open-loop mode, it is hard to control the amount of the flow accurately, and the situation will be worse after multiple times of adjustment. Consequently, in the prior art, there is no such a gas adjusting valve that can control multiple gas flows of gas channels independently at the same time or shut off each gas channel independently.

SUMMARY OF THE INVENTION

An object of the present application is to provide a multi-channel stepped motor operated gas adjusting valve, which can be accurately controlled by using an action position feedback signal and a control circuit, enable multi-position stepped adjustment on the gas flows in multiple gas channels simultaneously and shut off the gas channels separately.

In one aspect, the invention provides a multi-channel stepped motor operated gas adjusting valve, comprising a gear motor 1 and a valve shell 2. The valve shell 2 is provided with a gas inlet and a gas outlet. The gear motor 1 is mounted outside one wall of the valve shell 2. A driving shaft 6 of the gear motor 1 is inserted in the valve shell 2 and is in a sealing connection with the wall. N gas outlets 2-1 are provided on another wall of the valve shell 2 perpendicular to the driving shaft 6, and here N is an integer selected from the group consisting of 1~5. A cylindrical locator 3 is positioned on the driving shaft 6. A plurality of locating points (for example, protruding teeth) 3-2 are disposed on an outer circumference of the locator 3. A round gas distributor 4 is also provided to slidably connect with the locator 3 via splines. Center lines of the gas distributor 4, the locator 3 and the driving shaft 6 are aligned. A gas outlet O-ring 7 and a hard hollow washer 8 are positioned respectively in sequence from outside to inside at an inner port of each gas outlet 2-1, and an inner end face of the hard hollow washer 8 is slightly higher than that of the gas outlet 2-1. N groups of gas distribution grooves 4-3 and corresponding N gas distribution start holes 4-2 are disposed in a gas distributor disk 4-1 which is perpendicular to the center line of the gas distributor 4 and has a center located in the center line of the gas distributor 4. Each gas distribution groove 4-3 is rectangular and has a plurality of through holes each of which independently has a sectional area of 0-20 mm$^2$. All center lines of the gas distribution grooves 4-3 pass through the center O of the gas distributor disk 4-1. An Angle included between center lines of two adjacent gas distribution grooves 4-3 in each of the N groups are the same. Each gas distribution start hole 4-2 is aligned (coincided) with the corresponding gas outlet 2-1, and an angle included between a line, which connects a center of each gas distribution start hole 4-2 and the center O of the gas distributor disk 4-1, and the center line of the gas distribution groove 4-3 in each group adjacent to the gas distribution start hole 4-2 is the same. The gas adjusting valve also comprises movable sealing devices each of the movable sealing devices is located at a corresponding one of the gas outlets 2-1 and includes the inner port of the gas outlet 2-1 and the corresponding gas distribution start hole 4-2. A pressure spring 9 is disposed between the locator 3 and the gas distributor 4, such that the gas distributor disk 4-1 abuts against the hard hollow washer 8. A locating portion corresponding to the group of locating points 3-2 is disposed on an inner wall of the valve shell 2. The locating portion and the group of locating points 3-2 form a locator rotation angle detecting mechanism. Each of the locating points 3-2 corresponds to a corresponding one of the gas distribution grooves 4-3 of each group in turn one by one. Moreover, stopping blocks 2-2 are disposed on the inner wall of the valve shell 2 and correspond to a start state and an end state of the locator 3 respectively.

The movable sealing device consists of the inner port of the gas outlet 2-1, the gas outlet O-ring 7 and the hard hollow washer 8 disposed in the inner port, the gas distribution start hole 4-2 and a semi-enclosed cylinder 4-4 extending backwards from the starting hole, a sealing spring 10 and a rigid ball 11 mounted in the semi-enclosed cylinder 4-4. The rigid ball 11 has a diameter slightly larger than an inner diameter of the gas outlet O-ring 7 and is slightly smaller than an inner diameter of the hard hollow washer 8. The rigid ball 11 and the inner wall of the semi-enclosed cylinder 4-4 slidably fit each other.

In an embodiment, the locator rotation angle detecting mechanism is mechanical, and consists of the locating points 3-2 on the outer circumference of the locator 3 and the locating portion disposed on an inner wall of the valve shell 2. The locating points 3-2 are formed by vertical protruding teeth, and the locating portion consists of a locating spring 13-1, a stroke limiting sheet 13-2 and a slide tooth 13-3. The slide tooth 13-3 elastically contacts the group of vertical protruding teeth 3-2 on the outer circumference of the locator 3.

In an embodiment, the locator rotation angle detecting mechanism is electromagnetic, and consists of a plurality of permanent magnets arranged at same horizontal level on the outer circumference of the locator 3 and a hall element fixed on the inner wall of the valve shell 2 corresponding to group of the permanent magnets.

In an embodiment, the locator rotation angle detecting mechanism is photoelectric, and consists of a plurality of through holes arranged at same horizontal level on the outer circumference of the locator 3, as well as light an emitting diode and a photoelectric receiving tube, which are disposed separately on two sides of the group of through holes and fixed on the valve shell 2.

In an embodiment, an arch distance between adjacent edges of two adjacent gas distribution grooves 4-3 in the same group is smaller than the inner diameter of the hard hollow washer 8.

In an embodiment, when the gas distribution start hole 4-2 and the last gas distribution groove 4-3 both are located in the corresponding gas outlets 2-1, respectively, two stopping blocks 2-2 in different positions stop the locator 3.

In an embodiment, the amount of the gas distribution grooves in each group is 1 to 10.

In an embodiment, when the motor operated gas adjusting valve operates, the driving shaft 6 of the gear motor 1, being inserted in the valve shell 2, drives the gas distributor 4 to rotate via the locator 3, and the splines 3-1, 4-5. The gas distributor disk 4-1 presses the hard hollow washer 8 under the pressure of the pressure spring 9. Due to the O-ring 7 disposed between the inner port of the gas outlet 2-1 and the hard hollow washer 8, when surfaces of the hard hollow washer 8 and the gas distributor disk 4-1 contacting with each other have sufficient smoothness and are coated with high grade silicone oil, which has both functions of smoothing and sealing and is not easy to dry up or deteriorate, the gas leaking amount between the contacting surfaces is less than the permissive gas leaking amount of the gas adjusting valve. In the start state, all the centers of the gas distribution start holes 4-2 in different groups are vertically aligned with the centers of the corresponding gas outlets 2-1, the angle included between the center lines of two adjacent gas distribution grooves 4-3 in the same group is the same, and the angle included between the line, which connects the center of each gas distribution start hole 4-2 with the axle center of the driving shaft 6, and the center line of the gas distribution groove 4-3 adjacent to the gas distribution start hole 4-2 is the same. When the driving shaft 6 drives the locator 3 and the gas distributor 4 to rotate, the gas distribution grooves 4-3 with the same sequence number in the groups of gas distribution grooves can be aligned with the corresponding gas outlets 2-1 simultaneously. When a certain gas distribution groove 4-3 is aligned with the corresponding gas outlet 2-1, the corresponding locating point 3-2 on the outer circumference of the locator 3 and the locating portion 13 fixed on the valve shell 2 interact with each other to generate a position signal. A control circuit can determine an accurate position of the rotating gas distributor 4 according to the signal and make the corresponding gas distribution grooves 4-3 be aligned with the corresponding gas outlets 2-1 accurately. When the gas distributor 4 rotates to the starting hole 4-2 in each group of the gas distribution grooves 4-3, the rigid ball 11 passes the hard hollow washer 8 and presses against the O-ring 7 due to the effect of the sealing spring 10, so as to seal the gas outlet 2-1. When more gas distribution grooves 4-3 in each group are provided, the rotating of the gas distribution grooves 4-3 to pass the corresponding gas outlets 2-1 in turn can be achieved by rotating gas distributor 4 with a smaller rotation angle, that is, to finish the process of changing gas in the gas outlets 2-1 in a shorter adjusting time. The gas distribution groove 4-3 has a rectangle groove provided in the side facing the hard hollow washer 8, and has through holes at the opposite side thereof. Each of the through holes has a predetermined sectional area according to the gas output quantity. If a certain gas distribution groove 4-3 of the gas distributor 4 is required to shut off gas when it is rotated to one of the gas outlets 2-1, the sectional area of the through hole of this gas distribution groove 4-3 can be designed to be zero. The arch distance between adjacent edges of two adjacent gas distribution grooves 4-3 in the same group is smaller than the inner diameter of the hard hollow washer 8, as a result, the output gas would not be totally shut off during the rotating process from one previous gas distribution groove 4-3 to the next gas distribution groove 4-3 while the gas distributor 4 is rotating.

In an embodiment, when the locator rotation angle detecting mechanism is mechanical, during the process that the driving shaft 6 drives the locator 3 and the gas distributor 4 to rotate, if the locating points 3-2 of the locator 3 are rotated to locate between two adjacent gas distribution grooves 4-3, due to the limitation of the stroke controlling sheet 13-2, the slide tooth 13-3 does not contact the outer circumference of the locator 3. At this time, the gear motor 1 only needs to overcome a friction force between the gas distributor disk 4-1 and the hard hollow washer 8. When the locator 3 rotates to a position where the protruding tooth 3-2 contacts the slide tooth 13-3, the gear motor 1 not only needs to overcome the mentioned friction force, but also needs to overcome a force on the slide tooth 13-3 applied by the locating spring 13-1. At that moment, the driving force of the gear motor 1 is required to increase. When the locator 3 rotates back to the position of the starting hole 4-2 of the gas distributor and contacts one of the stopper blocks 2-2, the gear motor 1 is in a braking state and bears the largest force. Since the bigger the load is, the higher the driving current of the micro DC current motor is, during the above process, when the locating points 3-2 of the locator 3 rotate to locate between two adjacent gas distribution grooves 4-3, the driving current of the gear motor 1 is lowest; and when the protruding tooth 3-2 contacts the slide tooth 13-3, the driving current of the gear motor 1 increases. The magnitude of the current can be adjusted by adjusting the elastic force of the locating spring 13-1. When the gear motor 1 is in the braking state, the driving current is highest. But, if the current of the gear motor 1 is limited, the micro motor and the reduction gear may not be damaged. The control circuit can acquire the accurate positions of the locator 3 and the gas distributor disk 4-1 by detecting the change of the driving current in the above three states, that is, the control circuit can perform a close-loop control according to the position signal.

When the locator rotation angle detecting mechanism is electromagnetic, a plurality of changing position signals are generated by interacting of the row/group of permanent magnets mounted on the outer circumference of the locator 3 and the hall element fixed on the valve shell 2, and input to the control circuit to achieve the close-loop control.

In an embodiment, when the locator rotation angle detecting mechanism is photoelectric, the light emitted from the light emitting diode on the valve shell 2 passes the group of through holes on the outer circumference of the locator 3, arrives at the light receiving tube, and generates a set of position signals changing between ON and OFF, and then the group of signals are input to the control circuit to achieve the close-loop control.

In an embodiment, by limiting the gas flow by means of the through holes with different predetermined sectional areas in the gas distribution grooves 4-3, the purpose of adjusting the gas flow accurately can be achieved. When a certain locating point 3-2 of the locator 3 rotates to a position corresponding to the locating portion, the gas distribution grooves 4-3 with the same sequence number in the groups of gas distribution grooves are aligned with the corresponding gas outlets 2-1, and the gas output quantity of each gas outlet 2-1 is determined by the sectional area of the through hole of each gas distribution groove 4-3. As a result, it is capable to flow out required gas in different quantities from the gas outlets 2-1. In the meantime, the locator 3 can send position signals, thus the system can be controlled in a close-loop by the control circuit. Since each gas distribution start hole 4-2 is totally sealed by the gas outlet sealing spring 10, the rigid ball 11 and the gas outlet O-ring 7, after each operation of the gas adjusting valve, only by rotating the distribution start holes 4-2 back to the corresponding gas outlets 2-1 via the control circuit, all the gas channels of the adjusting valve can be closed at the same time, and the starting position of the adjusting valve for restarting can be determined. The adjusting valve does not operate any more when the predetermined gas flow is achieved, and it does not consume electric power any more.

To sum up, compared with the prior art, the invention has the advantages herein below.

(1) It is capable of adjusting gas flows of multiple gas channels accurately in a multiple stepped close-loop way in a system.

(2) The gas channels can be shut off completely after the operation of the adjusting valve.

(3) When the adjusting valve operates at a gas flow of a predetermined value or after the adjusting valve stops operating, the gear motor does not work any more, so the whole adjusting valve does not consume electric power.

The invention is adapted to the gas appliances, which do not need to quickly adjust the gas flow, but need to accurately adjust the gas flows in multi-channel stepped mode and consume less power.

DETAILED DESCRIPTION OF THE PREFERRED EMBODIMENTS

Hereinafter, the embodiments will be described in details along with the accompanying drawing.

First Embodiment

Figure 1:
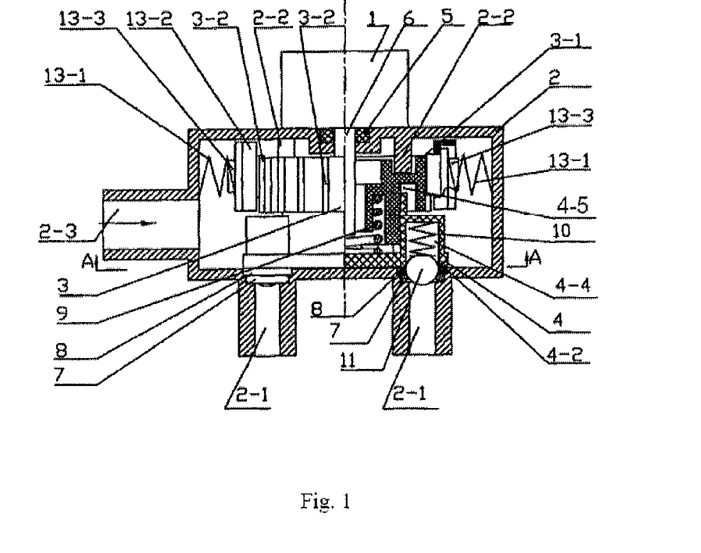
FIG. 1 is a structural schematic view of a multi-channel stepped motor operated gas adjusting valve in accordance with a first embodiment of the invention, wherein the adjusting valve has a mechanical locator rotation angle detecting mechanism.
Figure 2:
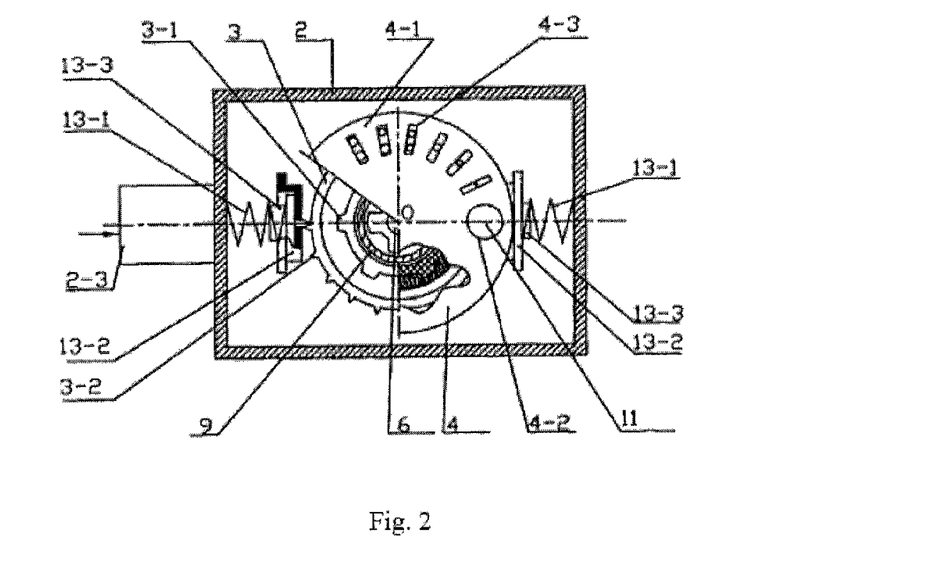
FIG. 2 is a sectional schematic view along line A-A in FIG. 1.

As shown in FIGS. 1 and 2, a mechanical multi-channel stepped motor operated gas adjusting valve includes a gear motor 1, a valve shell 2, a locator 3, a gas distributor 4, and a locator rotation angle detecting mechanism. The gear motor 1 is mounted outside a wall of the valve shell 2, and a driving shaft 6 of the gear motor 1 is inserted in the valve shell 2 and is in a sealing connection with the wall via an O-ring 5. Another wall of the valve shell 2 perpendicular to the driving shaft 6 is provided with two gas outlets 2-1, and the valve shell 2 is also provided with a gas inlet 2-3. A cylindrical locator 3 is mounted on the driving shaft 6; and a plurality of parallel vertical protruding teeth 3-2, functioning as locating points of the locator 3, are disposed on the outer circumference of the locator 3. The round gas distributor 4, via a spline 4-5 of itself own and a spline 3-1 of the locator, is slidably connected with the locator 3. The center lines of the gas distributor 4, the locator 3 and the driving shaft 6 are aligned. A gas outlet O-ring 7 and a hard hollow washer 8 are provided in sequence from outside to inside at an inner port of either of two gas outlets 2-1, and an inner end face of the hard hollow washer 8 is lightly higher than that of the gas outlet 2-1. Two groups of gas distribution grooves 4-3 and two corresponding gas distribution start holes 4-2 are disposed in a gas distributor disk 4-1 which is perpendicular to the center line of the gas distributor 4 and has a center located in the center line of the gas distributor 4. The gas distribution groove 4-3 is configured to be a rectangular semi-enclosed groove with at least one through hole in the groove. If more than one through holes are disposed, the through holes preferably have different diameters. Each through hole has a sectional area of 0-20 mm². All center lines of the gas distribution grooves 4-3 pass the center O of the gas distributor disk 4-1, i.e., an axis center of the driving shaft 6. The angle included between center lines of two adjacent gas distribution grooves 4-3 in the same group is the same. The gas distribution start hole 4-2 for each group of gas distribution grooves is aligned with the corresponding gas outlet 2-1, and the angle included between a line for connecting the center of each gas distribution start hole 4-2 with the center O of the gas distributor disk 4-1 and the center line of the gas distribution groove 4-3 adjacent to the gas distribution start hole 4-2 is the same. A pressure spring 9 is disposed between the locator 3 and the gas distributor 4, such that the gas distributor disk 4-1 abuts against the hard hollow washer 8. The gas adjusting valve also comprises movable sealing devices. Each of the movable sealing devices is located at the corresponding gas outlet 2-1 and includes an inner port of the gas outlet 2-1 and the corresponding gas distribution start hole 4-2. More specifically, the movable sealing device consists of the inner port of the gas outlet 2-1, the gas outlet O-ring 7 and the hard hollow washer 8 which are mounted in the inner port, the gas distribution start hole 4-2 and a semi-enclosed cylinder 4-4 extending backwards from the start hole, a sealing spring 10 and a rigid ball 11 which are mounted in the semi-enclosed cylinder 4-4. The rigid ball 11 has a diameter slightly larger than the inner diameter of the gas outlet O-ring 7 and slightly smaller than the inner diameter of the hard hollow washer 8, and the rigid ball 11 can reliably seal the gas outlet 2-1. The rigid ball 11 and the inner wall of the semi-enclosed cylinder 4-4 slide fit each other. A locating portion corresponding to the group of locating points 3-2 is disposed on the inner wall of the valve shell 2. A locator rotation angle detecting mechanism is formed by the group of the locating points 3-2 and the locating portion. Each locating point 3-2 in the group of locating points corresponds to the respective gas distribution groove 4-3 in the corresponding group of gas distribution grooves one by one. For a mechanical multi-channel stepped motor operated gas adjusting valve, a plurality of protruding teeth extending vertically and arranged on the outer circumference of the locator 3 function as the group of locating points 3-2. The locating portion consists of a locating spring 13-1, a stroke limiting sheet 13-2, and a slide tooth 13-3. The slide tooth 13-3 elastically contacts the group of protruding teeth 3-2 on the outer circumference of the locator 3 to vary the current of the gear motor 1 and sends a position signal to the control circuit. In this embodiment, to balance the force applied to the locator, two groups of locating points 3-2 and locating portions are symmetrically disposed on two sides of the locator and the valve shell 2, respectively. The valve shell 2 is also provided with a plurality of stopping blocks 2-2 for the locator 3 on the inner wall thereof. For example, there are two stopping blocks 2-2. One stopping block 2-2 corresponds to the start state of the locator 3, and the other stopping block 2-2 corresponds to the end state of the locator 3 in which the gas output quantity reaches a largest value.

Second Embodiment

Figure 3:
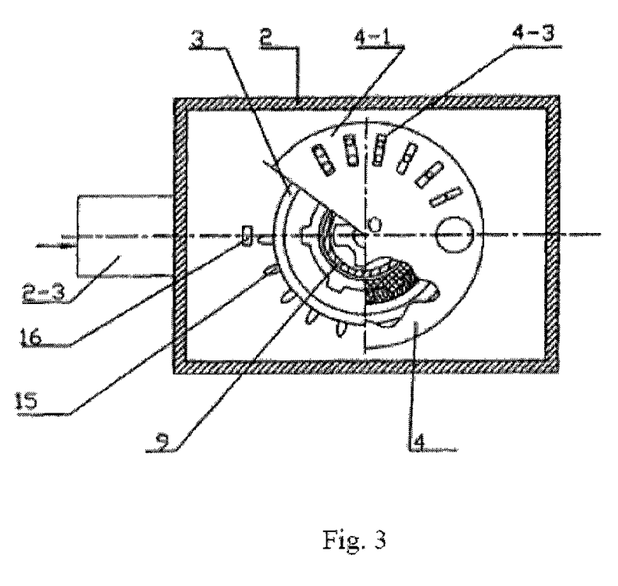
FIG. 3 is a structural schematic view of an electromagnetic locator rotation angle detecting mechanism adapted in a multi-channel stepped motor operated gas adjusting valve in accordance with a second embodiment of the invention.

As shown in FIG. 3, in the second embodiment, an electromagnetic multi-channel stepped motor operated gas adjusting valve is provided, i.e., the locator rotation angle detecting mechanism is electromagnetic, and other structures in this embodiment are the same as those in the first embodiment. The electromagnetic locator rotation angle detecting mechanism consists of a row of permanent magnets 15 arranged at a same horizontal level on the outer circumference of the locator 3 and a hall element 16 fixed on the inner wall of the valve shell 2 corresponding to the row of permanent magnets 15. When the locator 3 rotates, the hall element, due to the effect of the permanent magnets 15, would sends a position signal of the locator 3 to the control circuit, so as to control the gas output quantity.

Third Embodiment

Figure 4:
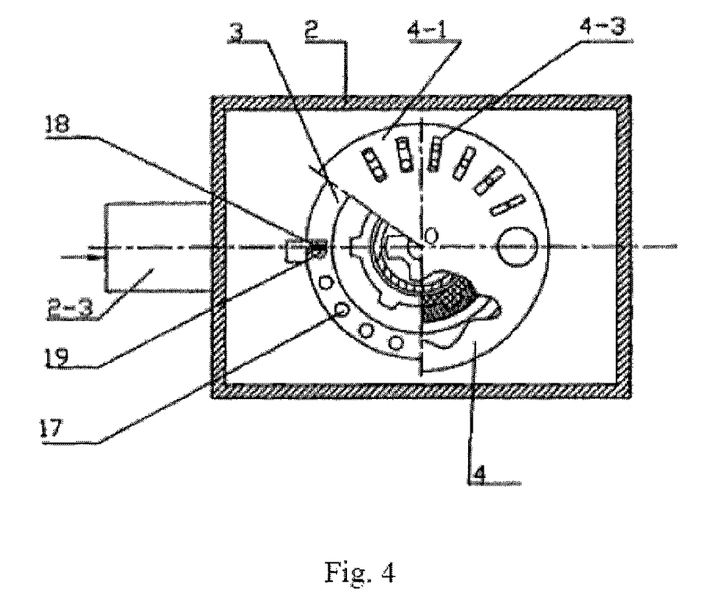
FIG. 4 is a structural schematic view of a photoelectric locator rotation angle detecting mechanism adapted in a multi-channel stepped motor operated gas adjusting valve in accordance with the third embodiment of the invention.

As shown in FIG. 4, in the third embodiment, a photoelectric multi-channel stepped motor operated gas adjusting valve is provided, i.e., the locator rotation angle detecting mechanism is photoelectric, and other structures are the same as those in the first embodiment. The photoelectric locator rotation angle detecting mechanism consists of a row of through holes 17 arranged at a same horizontal level on the outer circumference of the locator 3, and a light emitting diode 18 and a photoelectric receiving tube 19 which are disposed separately on two sides of the row of the through holes 17 and are fixed on the valve shell 2. When the locator 3 rotates, the photoelectric receiving tube 19 receives a light, which is emitted by the light emitting diode 18 and passes through the through hole 17, and outputs a position signal of the locator 3 to the control circuit, so as to control the gas output quantity.

Although the invention has been described as above in reference to several typical embodiments, it is to be understood that the terms used therein are just illustrative and exemplary rather than restrictive. Since the invention can be applied in various forms without departing from the spirit or principle of the invention, it is to be understood that the abovementioned embodiments will not be limited to any specific details mentioned above, rather, they should be construed broadly in the spirit or concept of the invention defined by the appended claims. Therefore, the present invention aims to cover all the modifications or variations falling within the protection scope defined by the appended claims.

The invention claimed is:

1. A multi-channel stepped motor operated gas adjusting valve comprising a gear motor and a valve shell, the valve shell being provided with a gas inlet and at least one gas outlet, the gear motor being mounted on an outside wall of the valve shell, a driving shaft of the gear motor being inserted in the valve shell and sealingly connecting with the wall, wherein, there are N gas outlets provided on another wall of the valve shell perpendicular to the driving shaft, and N is an integer selected from the group consisting of 1~5;

a cylindrical locator is positioned on the driving shaft; a plurality of locating points are disposed on an outer circumference of the locator, a round gas distributor is disposed to be slidably connected with the locator via splines, and center lines of the gas distributor, the locator and the driving shaft are vertically aligned;

a gas outlet O-ring and a hard hollow washer are positioned respectively in sequence from outside to inside at an inner port of each gas outlet, and an inner end face of the hard hollow washer is slightly higher than that of the gas outlet;

N groups of gas distribution grooves and corresponding N gas distribution start holes are disposed in a gas distributor disk which is perpendicular to the center line of the gas distributor and has a center O located in the center line of the gas distributor; each of the gas distribution grooves is rectangular and has a plurality of through holes each of which independently has a sectional area of 0-20 mm$^2$; all center lines of the gas distribution grooves pass through the center O of the gas distributor disk; an angle included between adjacent center lines of two adjacent gas distribution grooves in each of the N groups is the same; the gas distribution start hole coincides with the corresponding gas outlet; and an angle included between a line connecting a center of each gas distribution start hole with the center O of the gas distributor disk and the center line of the gas distribution groove adjacent to the gas distribution start hole is the same;

the multi-channel stepped motor operated gas adjusting valve also comprises movable sealing devices, and each of the movable sealing devices is located at the corresponding gas outlet and comprises the inner port of the gas outlet and the corresponding gas distribution start hole;

a pressure spring is disposed between the locator and the gas distributor, such that the gas distributor disk abuts against the hard hollow washer;

a locating portion corresponding to the group of locating points is disposed on an inner wall of the valve shell; the locating portion and the group of the locating points form a locator rotation angle detecting mechanism, and one to one correspondence is provided between each of the locating points and the corresponding each of the gas distribution grooves; and stopping blocks are disposed on the inner wall of the valve shell corresponding to a start state and an end state of the locator, respectively.

2. The multi-channel stepped motor operated gas adjusting valve according to claim 1, wherein, the movable sealing device consists of the inner port of the gas outlet, the gas outlet O-ring and the hard hollow washer disposed in the inner port, the gas distribution start hole and a semi-enclosed cylinder extending backwards from the gas distribution starting hole, as well as a sealing spring and a rigid ball installed in the semi-enclosed cylinder; the rigid ball has a diameter slightly larger than an inner diameter of the gas outlet O-ring and slightly smaller than an inner diameter of the hard hollow washer, and the rigid ball and the inner wall of the semi-enclosed cylinder slide fit each other.

3. The multi-channel stepped motor operated gas adjusting valve according to claim 1, wherein, the locator rotation angle detecting mechanism is mechanical, the locating points are formed by a plurality of vertical protruding teeth, and the locating portion consists of a locating spring, a stroke limiting sheet and a slide tooth, and the slide tooth elastically contacts the group of the vertical protruding teeth on the outer circumference of the locator.

4. The multi-channel stepped motor operated gas adjusting valve according to claim 1, wherein, the locator rotation angle detecting mechanism is electromagnetic, and consists of a row of permanent magnets arranged at a same horizontal level on the outer circumference of the locator and a hall element fixed on the inner wall of the valve shell corresponding to the row of the permanent magnets.

5. The multi-channel stepped motor operated gas adjusting valve according to claim 1, wherein, the locator rotation angle detecting mechanism is photoelectric, and consists of a row of through holes arranged at a horizontal level on the outer circumference of the locator, and a light emitting diode and a photoelectric receiving tube which are disposed separately on two sides of the row of through holes and fixed on the valve shell.

6. The multi-channel stepped motor operated gas adjusting valve according to claim 1, wherein, an arch distance between adjacent edges of two adjacent gas distribution grooves in each of the N groups is smaller than an inner diameter of the hard hollow washer.

7. The multi-channel stepped motor operated gas adjusting valve according to claim 1, wherein, when the gas distribution start hole and the last gas distribution groove are located at the corresponding gas outlet, respectively, one of the lock blocks stops the locator.

8. The multi-channel stepped motor operated gas adjusting valve according to claim 1, wherein, in each group of the gas distribution groove, the amount of the gas distribution grooves is 1 to 10.

* * * * *